Sept. 6, 1938.  J. BINDER  2,129,399
ARTICLE OF MANUFACTURE
Filed July 19, 1937
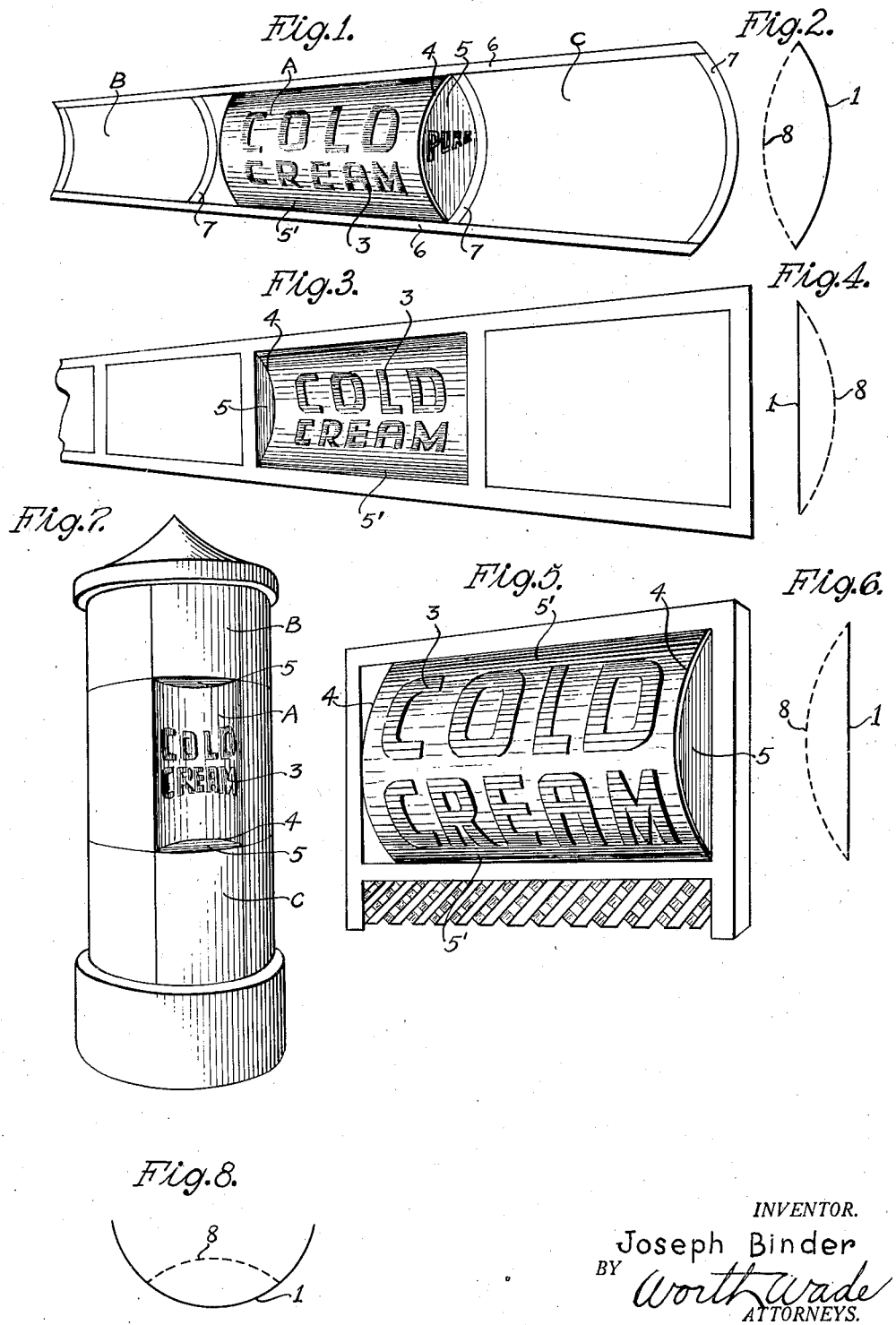
INVENTOR.
Joseph Binder
BY *Worth Wade*
ATTORNEYS.

Patented Sept. 6, 1938

2,129,399

UNITED STATES PATENT OFFICE 2,129,399

ARTICLE OF MANUFACTURE

Joseph Binder, New York, N. Y.

Application July 19, 1937, Serial No. 154,333

3 Claims. (Cl. 40—126)

The invention relates in general to advertisements, and, in particular, to an article adapted for use as an advertising medium, and to correlated improvements designed to enhance the value and extend the field of use of such articles.

For reasons of economy, advertisements frequently occupy but a portion of the surface upon which they are applied. For example, a billboard will be covered by a number of unrelated posters. Also, it is customary in vehicle advertising to position a number of advertising cards in a row upon a wall of a vehicle, as on the curved surface which joins the sides with the roof of a street car, railroad coach and the like. In the types of advertisements above mentioned the indicia obviously lie in the plane of the surface upon which the advertisement is applied. Accordingly, the uniform surface character of the several unrelated advertisements tends to prevent any one advertisement from standing out in comparison to its neighbors, so that individual distinctions must reside in color or in the meaning of the indicia.

It is a general object of the invention to provide means for rendering a particular advertisement attention arresting with respect to its neighbors and to make the copy optically distinguishable from the surrounding physical surfaces.

It is another object of the invention to provide an article adapted for use as an advertising medium which depends for attention arresting character upon surface element rather than upon color or meaning of the indicia.

It is a specific object of the invention to provide an advertisement characterized by being optically distinctive from neighboring advertisements of the conventional type heretofore known and which create a new optical effect adapted to quickly arrest the attention.

Other objects of the invention will in part be obvious and will in part appear hereinafter.

I have found that a curved surface is more attention arresting than a plane surface chiefly by reason of the uneven distribution of light and shade thereon, and this is especially true if the curved surface is in proximity to plane surfaces or to surfaces having an opposite sign of curvature. According to the present invention, there is provided an advertising medium which creates the optical illusion that the indicia-bearing surface is curved if the actual physical surface is flat, and curved in an opposite manner if the physical surface is curved. The article of the invention may take the form of a poster, carcard, sign, billboard, showcard, sheet, or other advertising medium having an indicia-bearing surface, and the specification and claims employ the expression "advertising medium" generically to include all such articles.

The invention accordingly comprises an article of manufacture having the elements and relation of elements one to another all as exemplified in the following detailed description, and the scope of the application of which will be given in the claims. For a more complete understanding of the nature and objects of the invention, reference should be had to the accompanying drawing, in which Fig. 1 represents one embodiment of the article of the invention in which the physical surface is curved and the optically-created surface is curved in the opposite manner.

Fig. 2 is a diagrammatic end view of the indicia-bearing surface of the article of Fig. 1;

Fig. 3 represents another embodiment of the article in which the physical surface is flat and the surface created by the optical illusion is curved in a concave manner;

Fig. 4 is a diagrammatic end view of the article of Fig. 3;

Fig. 5 is a modification of the article in which the indicia-bearing surface is flat and the optically-created surface is convex with respect to an observer;

Fig. 6 is a diagrammatic end view of the article of Fig. 5;

Fig. 7 is another embodiment of the article showing a convex curved surface bearing indicia giving the optical illusion that the indicia are applied to a concave curved surface;

Fig. 8 is a diagrammatic end view of the article of Fig. 7.

In the article of the invention, the actual physical surface which is to bear the indicia may be either curved or flat, but in every embodiment, the indicia creates the optical illusion or impression that they are applied to a curved surface which is different than that of the actual physical surface. It is understood that the indicia-bearing surface 1 is the physical surface of the advertising medium. The indicia 2 comprises, normally, the advertising copy 3, for example, the words "cold cream", and includes a representation of a poster comprising the curved lines 4 and the shaded areas 5, all of which impart to the physical surface 1 the optical impression of a curved surface 8, the so-called optical-created surface. As shown in the several Figs. 1, 3, 5 and 7, the advertising copy is distorted to conform with the curvature of the optically created surface and to give the impression that it is applied to such surface rather than to the physical surface.

In Fig. 1 there is represented one embodiment of the article, comprising a plurality of carcards applied to the curved surface which joins the side walls and the roof of a passenger car. This surface is usually provided with molding strips 6 at the top and bottom of the surface and with spring metal bands 7 which serve to divide the area into sections and to hold in place the advertising cards. The card A embodies the article of the present invention and the cards B and C on either side are of the conventional type. To the surface 1 of the card A there is applied, by suitable means, indicia 2 comprising the advertising copy 3, bounded by the curved lines 4 and the shaded areas 5, the lines 4 and the shaded area are so designed as to give the optical impression that the area 5 is an end view of a section of a cylinder. The curved lines 4 represent the edge of the optically-created surface. The advertising copy 3 is suitably distorted, i. e. fore-shortened at top and bottom to give the optical illusion that the copy is actually upon the surface of the optically created cylinder. It is clear that the conjoint effect of the copy 3, the lines 4 and the shaded area 5 is to impart the illusion to an observer that the copy 3 is applied to a convex curved surface 8 of Fig. 2 rather than to the physical surface 1. By reason of this, the card A will stand out in sharp contract to the neighboring cards B and C. In Fig. 2 there is shown a cross-section of the card A of Fig. 1, in which 1 designates the actual concave surface which bears the indicia and 8 represents the convex curved surface of the optical illusion created by the conjoint effect of the indicia elements 3, 4 and 5.

Figs. 3 and 4 represent two views of a poster of the invention, in which indicia is applied with suitable distortion to the flat surface 1 to create the optical illusion that the advertising copy 3 is on the curved concave surface 8 of Fig. 4.

Figs. 5 and 6 represent two views of a billboard embodying the invention, in which the actual surface 1 bearing the indicia is flat while the indicia appears to be applied to a curved surface 8 which is convex. The illusion of a convex surface is created by the distortion of the copy, the curved lines 4 and the shaded areas 5 and 5', the latter representing shading of the arcuate surface 8.

There is shown in Fig. 7 a poster column, the arcuate surface of which is designed to carry a number of posters, commonly of unrelated subject matter. The advertising copy 3 is distorted at each side to create the illusion of curvature to the indicia-bearing surface 1, while the lines 4 and the shading 5 and 5' coact with the copy 3 to create the illusion that the curvature is concave. The physical surface 1 and the optically created surface 8 are indicated in Fig. 8. In consequence of the contrast between the optically created surfaces of opposite manner of curvature, the poster A' is more attention arresting than the adjacent posters B' and C', other factors being equal.

Where it is not possible to have the poster of the invention adjacent a poster of the conventional type, the contrast between surfaces of different curvature may be obtained by printing certain indicia upon the shaded area 5 such latter indicia being suitably distorted to give the impression that it is applied to the optically created surface whether this be the end of a cylinder or other optically created article. Further to create contrast, it is within the scope of the invention to create the optical surface on a major portion only of the advertising medium and the remaining portions thereof may or may not bear indicia. For example, referring to Fig. 1 copy 3 may be applied to the area bounded by the lines 4 and the metal bands 7 and such copy may be suitably fore-shortened to create the impression that it is applied to the end of the optically created cylinder.

It is to be understood that the surface upon which the indicia are applied to form the article of the invention, may be a surface of wood, metal, stone, paper, cloth, plastic material and the like, and the indicia may be applied directly to the surface 1 or upon a sheet of suitable material such as paper which is fixed to the backing so as to conform to the surface 1. It is to be further understood that the indicia may be produced by hand as by direct application of paint, crayon, ink or other medium, by photographic reproduction, by printing, lithography, or any suitable combination of these means. To provide the necessary distortion of the indicia 3 comprising the advertising copy, the copy may be applied to a flat surface and then reproduced with suitable distortion through a lens of suitable curvature by hand or photography or both; or the indicia may be designed initially by hand with the necessary distortion to give the desired effect of optical curvature. It is to be understood that the invention is not to be limited to articles produced by any particular process and that the reproduction processes per se herein disclosed form no part of the present invention. It is also to be understood that various changes may be made in the invention and various embodiments of the article produced without transcending the scope of the invention.

In the specification and claims, the expression "advertising copy" is used generically to include letters, reading matter, designs, illustrations and the like.

I claim:

1. In combination, a sheet material, a representation of a poster comprising curved lines bounding an area of said sheet and shading thereon creating with said lines the optical impression of a curved surface, advertising indicia applied to the area of the sheet comprising the poster, said indicia being distorted to conform to the apparent curvature of the optically created surface of the poster whereby the impression is given that the advertising indicia is applied on a curved surface other than the physical surface of said sheet material.

2. In combination, a sheet material having a flat physical surface, a representation of an advertising poster comprising curved lines bounding an area of said sheet and shading thereon creating with said lines the optical impression of a curved surface, advertising indicia applied to the area of the sheet comprising the poster, said indicia being distorted to conform to the apparent curvature of the optically created surface of the poster whereby the impression is given that the advertising indicia is applied on a curved surface instead of on said flat physical surface.

3. In combination, a sheet material having a curved physical surface, a representation of an advertising poster comprising curved lines bounding an area of said sheet and shading thereon creating with said lines the optical impression of a surface curved in an opposite manner from said physical surface, advertising indicia applied to the area of the sheet comprising the poster, said indicia being distorted to conform to the apparent curvature of the optically created surface of the poster whereby the impression is given that the advertising indicia is applied on a curved surface other than the curved physical surface of said sheet.

JOSEPH BINDER.